US012693001B2

(12) United States Patent
Bae

(10) Patent No.: US 12,693,001 B2
(45) Date of Patent: Jul. 28, 2026

(54) LAMP

(71) Applicant: Jin Woo Bae, Seoul (KR)

(72) Inventor: Jin Woo Bae, Seoul (KR)

( * ) Notice: Subject to any disclaimer, the term of this patent is extended or adjusted under 35 U.S.C. 154(b) by 0 days.

(21) Appl. No.: 18/547,786

(22) PCT Filed: Jan. 18, 2022

(86) PCT No.: PCT/KR2022/000905
§ 371 (c)(1),
(2) Date: Aug. 24, 2023

(87) PCT Pub. No.: WO2022/181993
PCT Pub. Date: Sep. 1, 2022

(65) Prior Publication Data

US 2024/0142089 A1 May 2, 2024

(30) Foreign Application Priority Data

Feb. 25, 2021 (KR) ........................ 10-2021-0025220

(51) Int. Cl.

*F21V 14/04* (2006.01)
*F21V 7/05* (2006.01)
*F21V 21/30* (2006.01)
*F21Y 113/00* (2016.01)

(52) U.S. Cl.

CPC ................ *F21V 14/04* (2013.01); *F21V 7/05* (2013.01); *F21V 21/30* (2013.01); *F21Y 2113/00* (2013.01)

(58) Field of Classification Search

CPC ...................................................... F21V 14/04
See application file for complete search history.

(56) References Cited

U.S. PATENT DOCUMENTS

| | | | | |
|---|---|---|---|---|
| 4,692,849 A * | 9/1987 | Le Vantine | F21V 29/83 | 362/414 |
| 10,788,188 B2 | 9/2020 | Gladden et al. | | |
| 11,754,270 B2 * | 9/2023 | Feng | F21V 21/30 | 362/418 |
| 2004/0105271 A1 * | 6/2004 | Chen | F21S 6/003 | 362/413 |
| 2004/0114373 A1 * | 6/2004 | Lin | F21S 6/003 | 362/186 |

(Continued)

FOREIGN PATENT DOCUMENTS

| | | |
|---|---|---|
| CN | 2872078 Y | 2/2007 |
| CN | 208652219 U | 3/2019 |

(Continued)

OTHER PUBLICATIONS

Translation of JP 6755600 provided by ESPACENET (Year: 2019).*

(Continued)

*Primary Examiner* — Zheng Song
(74) *Attorney, Agent, or Firm* — Rabin & Berdo, P.C.

(57) ABSTRACT

The lamp comprises a light source configured to emit light, a support structure that supports the light source, and an optical component designed to change the characteristics of the light emitted from the light source. The support structure is configured to rotate both the light source and the optical component about a first axis, and the light source and the optical component are designed to move linearly relative to each other along a second axis.

9 Claims, 6 Drawing Sheets

(56) References Cited

U.S. PATENT DOCUMENTS

| | | | | |
|---|---|---|---|---|
| 2009/0161374 | A1* | 6/2009 | Teng | F21V 21/26 362/427 |
| 2010/0110677 | A1* | 5/2010 | Stein | F21S 4/28 362/297 |
| 2011/0051437 | A1* | 3/2011 | Ng | F21S 6/003 362/418 |
| 2011/0182063 | A1* | 7/2011 | Hsieh | F21V 21/30 362/220 |
| 2014/0029248 | A1 | 1/2014 | Dyson et al. | |
| 2016/0178142 | A1* | 6/2016 | Catalano | F21V 7/08 362/296.05 |
| 2017/0356633 | A1 | 12/2017 | Volek et al. | |
| 2018/0058647 | A1* | 3/2018 | He | F21V 21/116 |

FOREIGN PATENT DOCUMENTS

| | | | | | |
|---|---|---|---|---|---|
| CN | 109716018 | A | | 5/2019 | |
| JP | S6280901 | A | | 4/1987 | |
| JP | H6111606 | | * | 4/1994 | F21S 8/081 |
| JP | 2009-199924 | A | | 9/2009 | |
| JP | 4389795 | B2 | | 12/2009 | |
| JP | 2010153106 | A | | 7/2010 | |
| JP | 2013101782 | A | | 5/2013 | |
| JP | 2014116324 | A | | 6/2014 | |
| JP | 2019204804 | A | | 11/2019 | |
| JP | 6755600 | B2 | * | 9/2020 | |
| KR | 1020150086843 | A | | 7/2015 | |
| KR | 101691622 | B1 | | 1/2017 | |
| KR | 101793049 | B1 | | 11/2017 | |
| KR | 1020170120772 | A | | 11/2017 | |
| WO | WO-2011118354 | A1 | * | 9/2011 | F21S 6/003 |
| WO | WO-2021082866 | A1 | * | 5/2021 | F21S 6/003 |

OTHER PUBLICATIONS

English Machine Translation of JP2010153106 (Year: 2010).*
Japanese Office Action dated Aug. 27, 2024, in the counterpart Japanese Patent Application No. 2023-550324.
European Search Report dated Nov. 14, 2024, in the counterpart European Patent Application No. 22759912.3.

* cited by examiner

LAMP

TECHNICAL FIELD

The present invention relates to a lighting lamp such as a desk lamp and a floor-standing lamp.

BACKGROUND ART

Lamps such as desk lamps and standing lamps have various structures and functions depending on the purpose and need. In general, such a lamp is configured to illuminate a specific area by concentrating the irradiated light, and it is necessary to enable a user to change the direction of light for convenience of use. Although the light irradiation direction may be changed by moving or rotating the lamp itself so that the light is irradiated to a desired area, moving or rotating the lamp itself may cause inconvenience to a user and may not be easy due to spatial limitations.

To solve this problem, various methods for changing the direction of light emitted from a light source have been introduced. As an example, a widely known method is to configure a head where a light source is installed or a reflector that reflects light emitted from the light source to be tiltable. However, when the head or the reflector is tilted in a desired direction, there is a problem in that the peak illuminance of light is lowered and the position of the peak illuminance is only about ⅓ of the target moving distance. In addition, if the head or the reflector is rotated to be tilted, the light may directly enter the user's field of view and thus cause glare. As another example, although a method of two-dimensionally moving a reflector that reflects light on a planar plane has been introduced, this method has a problem in that the size of the reflector becomes very large depending on the size and arrangement of light sources. For example, when a plurality of light sources (e.g., LEDs) are used, a reflector is required to surround the area where the light sources are disposed, and in order to satisfy the condition that the reflector can move as desired on a plane while surrounding the area where the plurality of light sources are disposed, a big reflector is required. Although, in order to reduce the size of the reflector, a plurality of small light sources may be arranged and a separate reflector may be arranged for each light source to form an array type light source, in this case the length or width of the entire area in which the light sources are disposed is inevitably increased, and multiple shadows are generated due to the multiple light sources, resulting in a problem of deterioration of light quality.

PRIOR DOCUMENTS

U.S. Pat. No. 10,788,188 (2020 Sep. 29.)

U.S. patent publication No. US2014/0029248 (2014 Jan. 30.)

DETAILED DESCRIPTION OF THE INVENTION

Technical Object

The object this invention aims to solve is to provide a lamp that can achieve the desired peak illuminance, can change the direction of light emission without causing glare, and furthermore, have a slim and compact head or reflector.

Technical Solutions

A lamp according to an embodiment of the present invention includes: a light source configured to emit light; a support structure supporting the light source; and an optical component configured to change the characteristics of the light emitted from the light source. The support structure is configured to rotate both the light source and the optical component about a first axis, and the light source and the optical component are configured to move linearly relative to each other along a second axis.

The optical component may have a length in a direction perpendicular to the second axis that is shorter than a length thereof in a direction of the second axis.

The light source may have a length in a direction perpendicular to the second axis that is shorter than a length thereof in a direction of the second axis.

The support structure may include a first support extending along the first axis, and a second support that is connected to the first support and extends along the second axis.

The optical component may be a reflector configured to reflect the light emitted from the light source, or an optical lens.

The reflector may include a pair of first reflecting surfaces arranged to face each other along a direction of the second axis, and a pair of second reflecting surfaces arranged to face each other in a direction perpendicular to the second axis, and the first reflecting surface may have a more upright shape closer to a direction perpendicular to a surface where the light source is arranged, compared to the second reflecting surface.

Effect of the Invention

According to this invention, an optical element such as a reflector is configured to rotate around an axis along with the light source and is simultaneously configured to be able to undergo bidirectional linear movement along one direction, and this allows the optical element to be formed with reduced length in a direction perpendicular to the direction of the bidirectional linear movement.

EMBODIMENTS FOR CARRYING OUT THE INVENTION

Referring to the accompanied drawings, a detailed explanation is provided for an embodiment of the present invention in a manner that a person with ordinary knowledge in the art can readily implement. However, the present invention can be variously realized and is not limited to the described embodiments.

Figure 1:
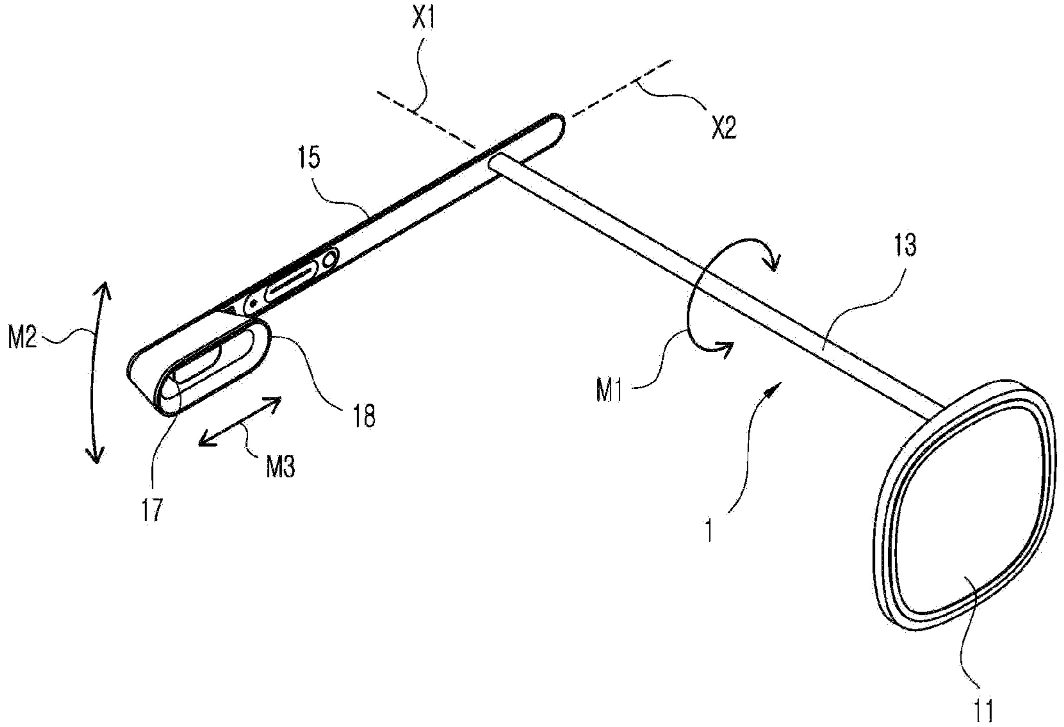
FIG. 1 is a bottom perspective view of a lamp according to one embodiment of the present invention.

A lamp according to an embodiment of the present invention may be a desk lamp as exemplarily shown in FIG. 1. Hereinafter, an embodiment of the present invention will be described using a desk lamp as an example, but a lamp according to another embodiment of the present invention may be another type of lamp such as a floor standing lamp.

Referring to FIG. 1, in accordance with an embodiment of the present invention, a lamp comprises a light source 20 that emits light and a supporting structure 1 that supports the light source 20. The supporting structure 1 can include a base 11, a vertical support 13 extending upward from the base 11, and a horizontal support 15 extending horizontally from the vertical support 13.

The base 11 can be designed to have a flat bottom surface that can rest on the top surface of a structure such as a desk, to provide support for the entire lamp. The vertical support 13 is connected to the base 11 and can extend upward from the base 11. For instance, the vertical support 13 can take a form of a long rod extending approximately vertically.

The horizontal support 15 is attached to the vertical support 13 and may extend horizontally. For example, the horizontal support 15 may have the form of a long rod extending in a direction approximately perpendicular to the extension direction of the vertical support 13.

Figure 6:
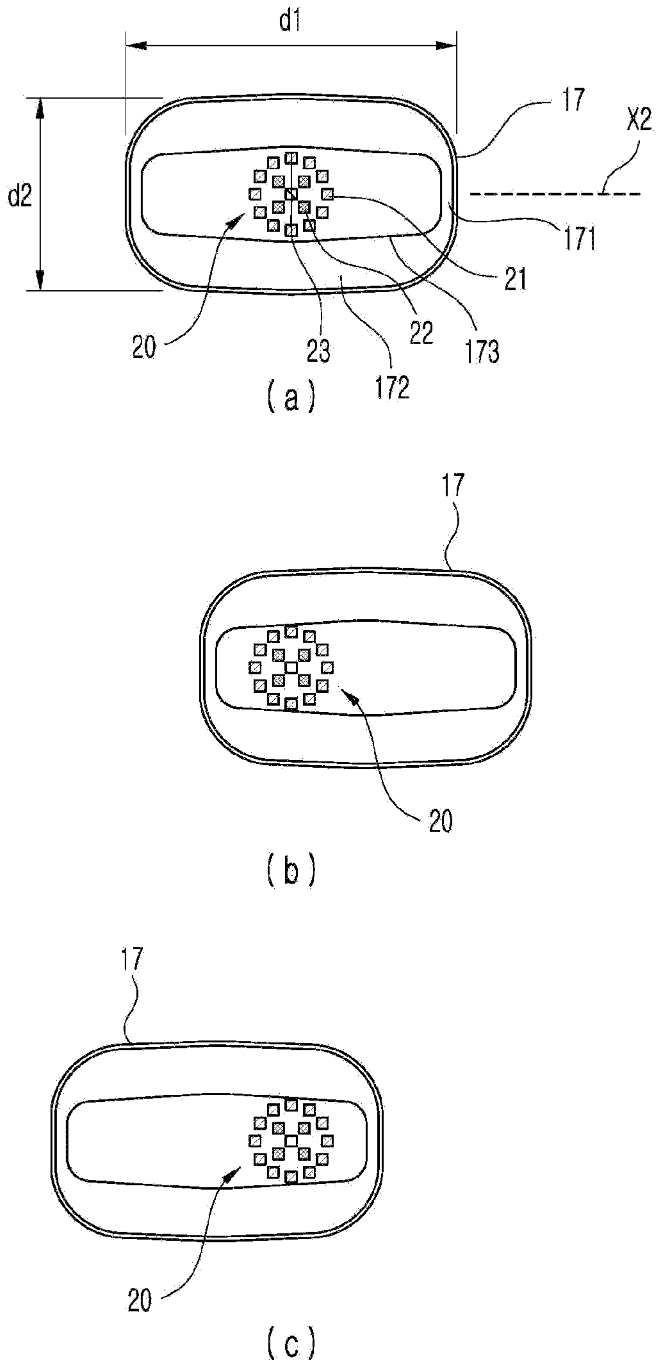
FIG. 6 is a drawing illustrating changes in the relative positions of a light source and a reflector according to the position change of a reflector in a lamp according to an embodiment of the present invention.

The light source 20 is mounted on the horizontal support 15. For example, as illustrated in FIG. 6, the light source 20 may include LED elements 21, 22 and 23 that emit lights of different color temperatures, and the LED elements 21, 22 and 23 may be mounted on a circuit board 25. As exemplarily shown in FIGS. 1, 3 and 4, the light source 20 may be mounted on the lower surface of the end portion of the horizontal support 15. In this embodiment, the light source 20 is supported by a combination of the vertical support 13 and the horizontal support 15, but in other embodiments, a single support may be configured to support the light source 20.

An optical component 17 is provided to change the characteristics of the light emitted from the light source 20. The optical component 17 can be any optical element designed to change or improve any light characteristics, such as reflection, diffusion, and refraction of light. In FIG. 1, the optical component 17 is exemplarily shown as a reflector that reflects light, and in other embodiments, the optical component 17 may be an optical lens with functions such as focusing or diffusing light. Hereinafter, the case where the optical component is a reflector will be described as an example.

Figure 3:
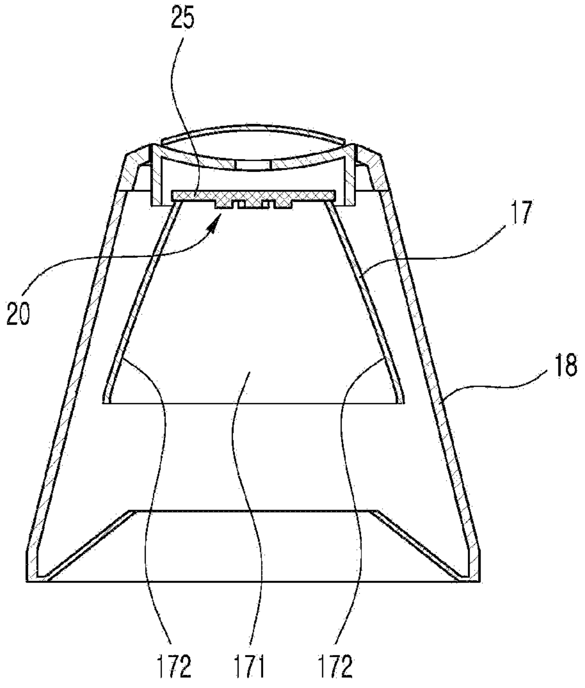
FIG. 3 is a sectional view taken along a line III-III of FIG. 2.
Figure 4:
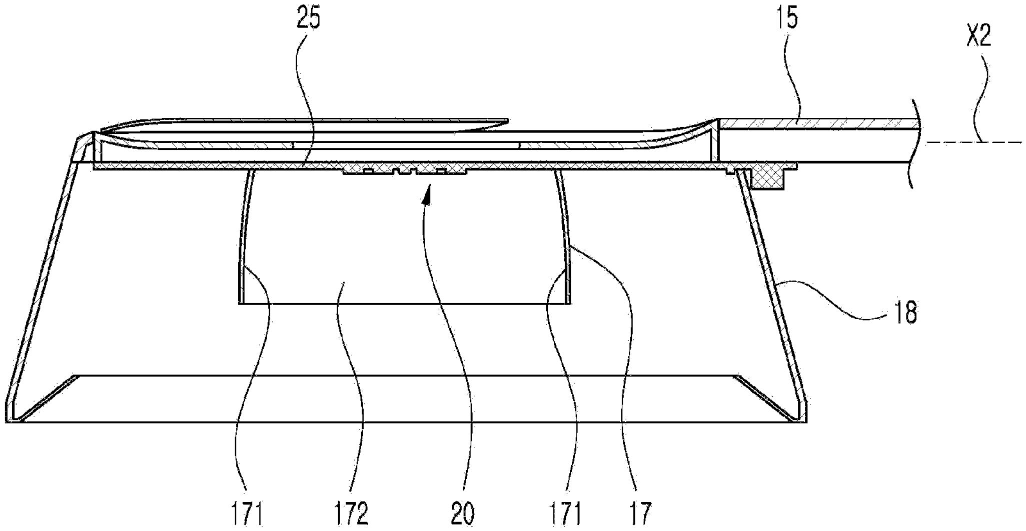
FIG. 4 is a sectional view taken along a line IV-IV of FIG. 2.
Figure 5:
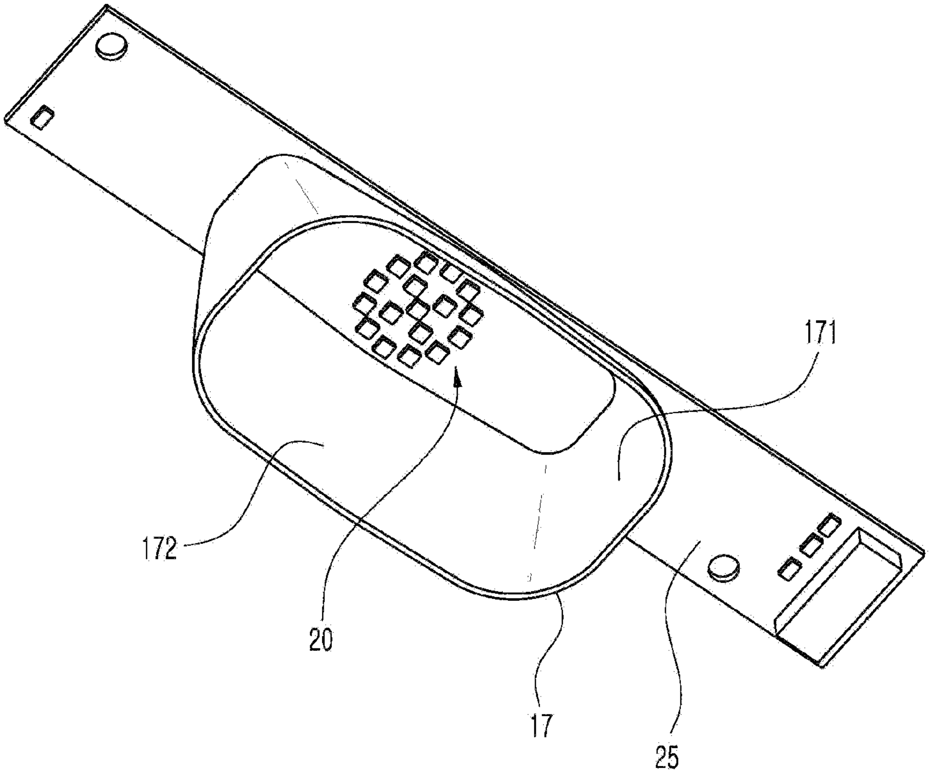
FIG. 5 is a perspective view of a reflector and a light source of a lamp according to an embodiment of the present invention.

The reflector 17 may be formed to surround the area where the light source 20 is positioned and reflect light emitted from the light source to proceed in a desired direction. Referring to FIGS. 3, 4 and 5, the reflector 17 may be provided with reflection surfaces 171 and 172 for reflecting light. The reflector 17 may be attached to the horizontal support 15 to surround the area where the light source 20 is positioned, and the reflection surfaces 171 and 172 may have a shape that expands roughly downward. Although the reflector 17 may be attached to the horizontal support 15, if the light source 20 is formed as a separate light source module and installed on the horizontal support 15, it may also be attached to the light source module.

The support structure 1 is configured to rotate both the light source 20 and the reflector 17 around a first axis X1. For example, referring to FIGS. 1 and 2, due to the movement of the vertical support 13 and the horizontal support 15, the light source 20 and the reflector 17 can rotate in rotation direction M2 about the first axis, i.e., the vertical direction axis X1. As a result, the light source 20 and the reflector 17 can rotate along an arc-shaped trajectory about the first axis X1. To implement such a movement of the light source 20 and the reflector 17, for example, the horizontal support 15 is configured to rotate about the first axis X1. More specifically, the vertical support 13 is designed to rotate about the first axis X1 centered on a rotation direction M1, and the horizontal support 15 is fixedly attached to the vertical support 13, thereby allowing the horizontal support 15 to rotate about the first axis X1. Meanwhile, in another embodiment of the invention, the vertical support may be fixedly attached to the base, and the horizontal support can be configured to rotate around the first axis.

Meanwhile, the light source 20 and the reflector 17 are configured to move relative to each other along a second axis X2. As one example to implement the relative movement between the light source 20 and the reflector 17, one of the light source 20 and the reflector 17 can be installed to remain in a fixed position, and the other can be configured to move relative to the other along the second axis X2. Alternatively, both the light source 20 and the reflector 17 can be configured to move either independently or dependently relative to each other. Hereinafter, an example where the light source 20 remains in a fixed position and the reflector 17 is movable will be described.

Figure 2:
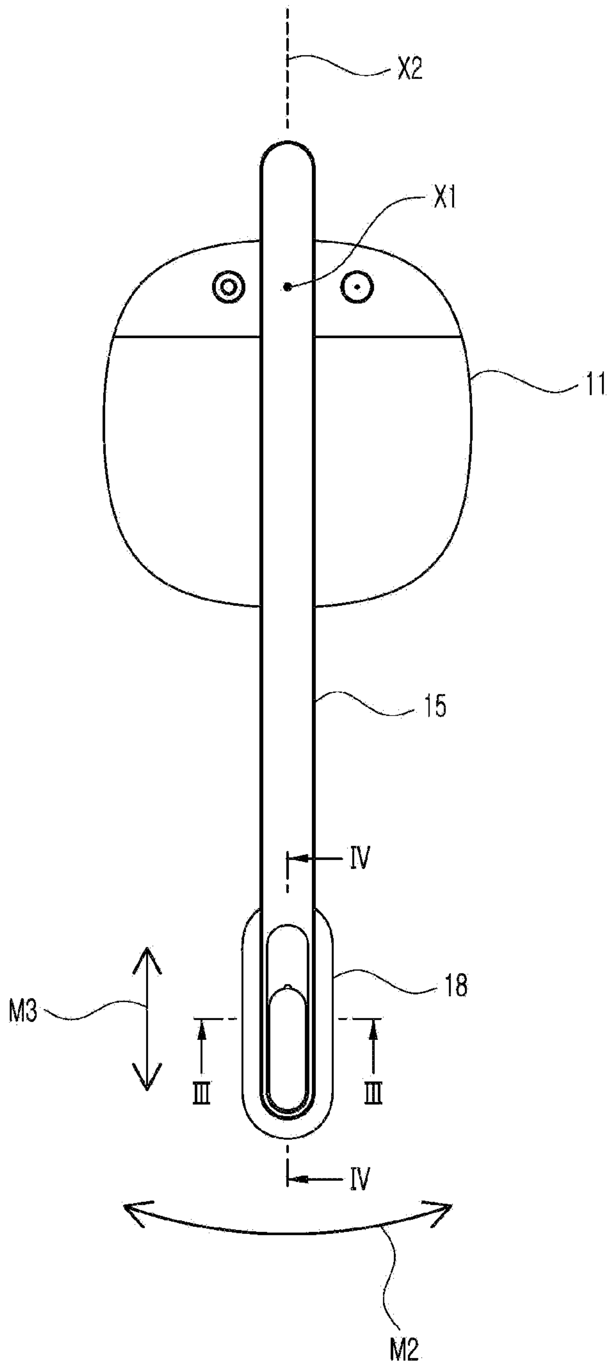
FIG. 2 is a top plan view of a lamp according to one embodiment of the present invention.

The light source 20 can be installed to remain in a fixed position on the horizontal support 15, and the reflector 17 can be movably attached to the horizontal support 15 so that its relative position to the light source 20 can change. For example, the reflector 17 may be connected to the horizontal support 15 to be able to move along a linear movement direction M3 along the second axis X2. In this case, the second axis X2 may be the lengthwise axis of the horizontal support 15. For example, the reflector 17 can be connected to the horizontal support 15 through a linearly movable connection structure, like a rail structure. Referring to FIG. 1, a lampshade 18 that surrounds the reflector 17 may be provided. The lampshade 18 may be fixed to the horizontal support 15 to surround the reflector 17 and may have an open side to allow the passage of light. Referring to FIGS. 1 and 2, because the light source 20 and the reflector 17 can rotate together in the rotation direction M2 and the reflector 17 can move linearly in the direction M3 relative to the light source 20, the direction of the light radiated from the light source 20 can be varied, allowing the illumination area of the light to move across a certain area on a plane.

Referring to FIG. 6, the reflector 17 may be designed such that its length d1 in the direction of the second axis X2 is greater than its width d2 in the direction perpendicular to it (vertical direction in FIG. 3). Accordingly, the frontal edge 173 of the reflecting surface 171 that surrounds the area where the light source 20 is positioned can also have a length and width in a ratio similar to the ratio of the two lengths d1 and d2, and this design allows the frontal edge 173 of the reflecting surface 171 of the reflector 17 to surround the area where the light source 20 is located and to move linearly along the second axis X2 while maintaining a slender shape. Accordingly, a length of the reflector 17 in a direction perpendicular to the length direction of the horizontal support 15 can be reduced, leading to a slim design for the reflector 17. As shown in FIG. 6 (*a*), if the light source 20 is positioned in the middle of the area formed by the frontal edge 173 of the reflecting surface 171, there's a free space on both sides of the light source 20 for the movement of the reflector 17, and due to this space, the reflector 17 can move linearly along the second axis X2 as shown in FIGS. 6 (*b*) and (*c*). The direction of the light radiated from the light source 20 changes based on the position of the reflector 17 along the direction of the second axis X2. At this time, as shown in FIG. 6, the light source 20 may include LEDs 21, 22 and 23 that emit light of different color temperatures, and the number of each LED 21, 22 and 23 can be appropriately selected based on requirements.

The reflector 17 includes a pair of first reflecting surfaces 171 arranged to face each other along the second axis X2 and a pair of second reflecting surfaces 172 arranged to face each other in a direction perpendicular to the second axis X2. In accordance with an embodiment of the invention, the first reflecting surface 171 is shaped to be more upright than the second reflecting surface 172 to ensure that when the reflector 17 moves linearly, the position of maximum luminance in the illuminated area moves to the desired distance proportionately to the movement of the reflector 17. Referring to FIGS. 3 and 4, the first reflecting surface 171 is shaped to be closer to a vertical direction relative to the plane where the light source 20 is installed, while the second reflecting surface 172 has a gentler slope, with its lower part extending further outward. This specific design of the first reflecting surface 171 and the second reflecting surface 172 allows for effective movement of the position with the maximum luminance when the reflector 17 is moved.

According to an embodiment of the present invention, the direction of light can be varied by two movements, namely the simultaneous rotational movement of the light source 20 and the reflector 17, and the relative linear movement between the light source 20 and the reflector 17. Due to the simultaneous rotational movement of the light source 20 and the reflector 17, the direction of light can move along a circular arc trajectory about the first axis X1, and due to the relative linear movement between the light source 20 and the reflector 17, the direction of light can linearly move along the second axis X2. These two movements allow the direction of light to move over a certain area. In particular, by enabling the reflector 17 and the light source 20 to have a relative linear movement in both directions along the second axis X2, the reflector 17 can be made relatively long to secure enough space for movement in the direction of the second axis X2 and can be minimized in size to enclose the light source 20 in a direction perpendicular to the second axis X2, and as a result, the reflector 17 can be made slimmer due to the reduction in length in the direction perpendicular to the second axis X2. In the present invention, by allowing the relative movement between the reflector 17 and the light source 20 in only one direction, namely along the second axis X2, the reflector 17 has a relatively large length in this movement direction to secure space for movement but has a relatively small length approximating the area occupied by the light source in other directions. Unlike the present invention, when configuring a reflector to move in two perpendicular directions on a 2D plane, the reflector must secure additional space for movement in each of these perpendicular directions, necessitating a circular shape for the reflector and consequently resulting in a larger size.

Figure 7:
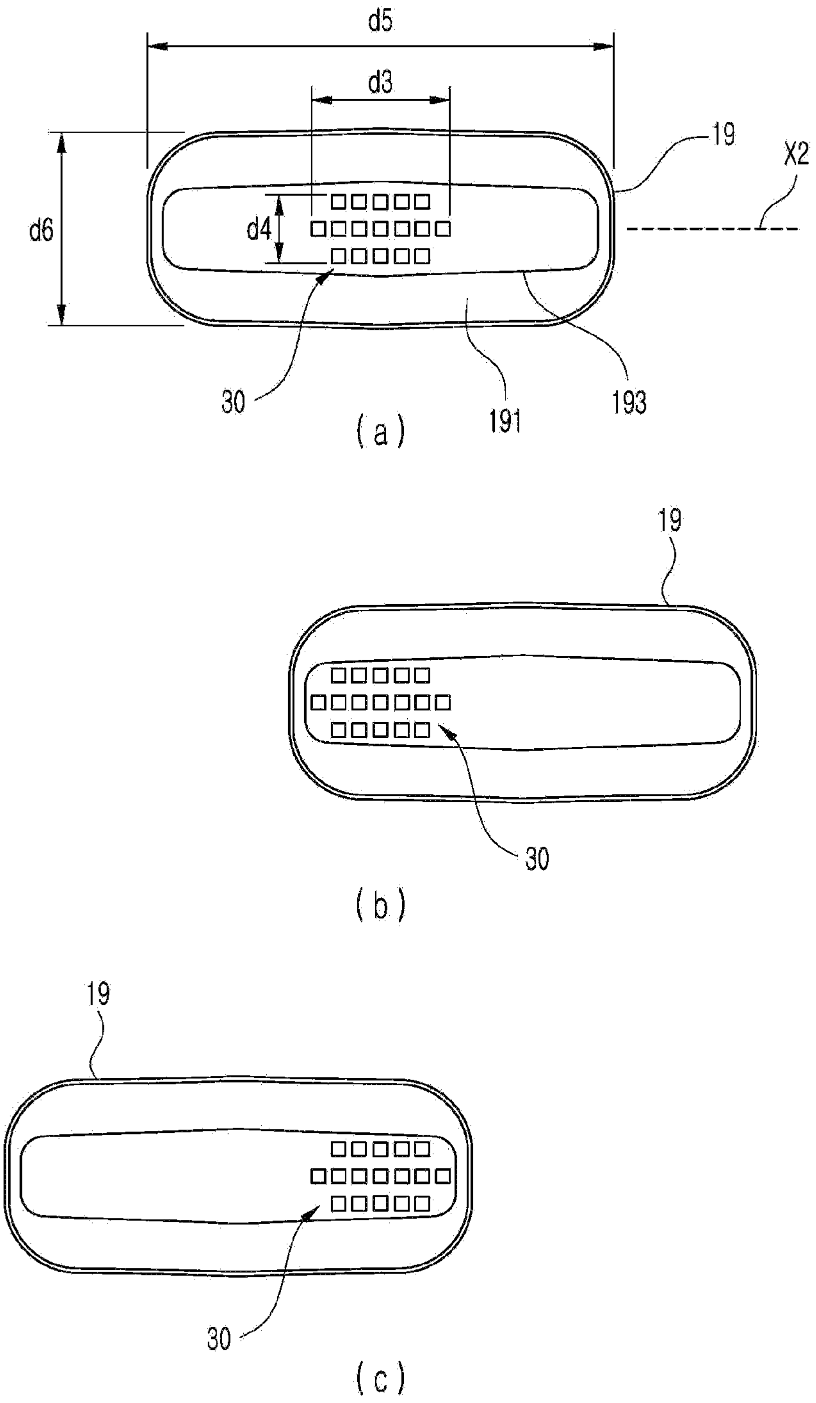
FIG. 7 is a drawing illustrating changes in the relative positions of a light source and a reflector according to the position change of a reflector in a lamp according to another embodiment of the present invention.

FIG. 7 is a drawing showing changes in the relative positions of the light source and the reflector due to changes in the position of the reflector of the lamp according to another embodiment of the present invention. Referring to FIG. 7, in this embodiment, the area occupied by the light source 30 also has a slim shape where its length d4 in the direction perpendicular to the direction of the linear movement of the reflector 19, i.e., the second axis X2, is shorter than its length d3 in the direction perpendicular to it. As a result, the reflecting surface 191 and the frontal edge 193 of the reflector 19 can also have a slim shape with a reduced length in the direction perpendicular to the second axis X2. Consequently, the reflector 19 can have a slim shape having a more reduced length d6, compared to the length d5 in the direction of the second axis X2, in the direction perpendicular to it. Thus, the reflector 19 can move between the positions shown in (a), (b) and (c) of FIG. 7 while surrounding the light source 30, and therefore the reflector 19 can have a slim shape having a more reduced length in the direction perpendicular to the direction of linear movement, i.e., the direction of the second axis X2.

While the embodiments of the invention have been described above, the scope of the invention is not limited to them and the various modifications and improved forms using the basic concept of the invention defined in the following claims are also included within the scope of the invention.

INDUSTRIAL APPLICABILITY

The present invention relates to a lamp and can be applied to a lighting device to have an industrial applicability.

The invention claimed is:

1. A lamp comprising:
a light source configured to emit light;
a support structure supporting the light source; and
an optical component configured to change characteristics of the light emitted from the light source;
wherein the support structure comprises a first support extending along a first axis, and a second support that is connected to the first support and extends along a second axis;
wherein the support structure is configured to be able to rotate both the light source and the optical component about the first axis;
wherein the light source and the optical component are configured to be able to move linearly relative to each other along the second axis;
wherein the optical component has a single inlet larger than an area of the light source, and a relative linear movement between the light source and the optical component is performed within an area of the single inlet;
wherein the optical component is configured such that, during the relative linear movement, a luminous flux emitted through the optical component remains substantially constant and a movement of an illumination area on a target surface is continuous and monotonic; and
wherein the optical component is configured such that, during the relative linear movement, a displacement amount of the illumination area on the target surface according to the relative linear movement is amplified to be greater than an amount of the relative linear movement between the light source and the optical component.

2. The lamp of claim 1, wherein the optical component has a length in a direction perpendicular to the second axis that is shorter than a length thereof in a direction of the second axis.

3. The lamp of claim 2, wherein the light source has a length in a direction perpendicular to the second axis that is shorter than a length thereof in a direction of the second axis.

4. The lamp of claim 3, wherein the optical component is a reflector configured to reflect the light emitted from the light source, or an optical lens.

5. The lamp of claim 2, wherein the optical component is a reflector configured to reflect the light emitted from the light source, or an optical lens.

6. The lamp of claim 1, wherein the optical component is a reflector configured to reflect the light emitted from the light source, or an optical lens.

7. The lamp of claim 6, wherein the reflector comprises a pair of first reflecting surfaces arranged to face each other along a direction of the second axis, and a pair of second reflecting surfaces arranged to face each other in a direction perpendicular to the second axis, and wherein the first reflecting surface has a more upright shape closer to a direction perpendicular to a surface where the light source is arranged, compared to the second reflecting surface.

8. The lamp of claim 1, wherein the illumination area on the target surface moves monotonically in a direction identical to a direction of the relative linear movement of the optical component relative to the light source.

9. A lamp comprising:

a light source configured to emit light;

a support structure comprising a first support extending along a first axis, and a second support connected to the first support and extending along a second axis; and an optical component configured to change characteristics of the light emitted from the light source, wherein the support structure is configured to be able to rotate both the light source and the reflector about the first axis, and wherein the optical component, which is configured to be able to move linearly relative to the light source, is a reflector configured to reflect the light emitted from the light source.

* * * * *